US012585246B2

(12) United States Patent
Imanishi

(10) Patent No.: US 12,585,246 B2
(45) Date of Patent: Mar. 24, 2026

(54) ROBOT CONTROL DEVICE AND NUMERICAL CONTROL SYSTEM

(71) Applicant: FANUC CORPORATION, Yamanashi (JP)

(72) Inventor: Kazutaka Imanishi, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 330 days.

(21) Appl. No.: 18/260,612

(22) PCT Filed: Jan. 27, 2022

(86) PCT No.: PCT/JP2022/003030
§ 371 (c)(1),
(2) Date: Jul. 6, 2023

(87) PCT Pub. No.: WO2022/163744
PCT Pub. Date: Aug. 4, 2022

(65) Prior Publication Data
US 2024/0053729 A1 Feb. 15, 2024

(30) Foreign Application Priority Data
Jan. 29, 2021 (JP) ................................ 2021-013002

(51) Int. Cl.
*G05B 19/4155* (2006.01)
*B23Q 15/12* (2006.01)

(52) U.S. Cl.
CPC ......... *G05B 19/4155* (2013.01); *B23Q 15/12* (2013.01); *G05B 2219/33099* (2013.01)

(58) Field of Classification Search
None
See application file for complete search history.

(56) References Cited

U.S. PATENT DOCUMENTS

2015/0253757 A1* 9/2015 Ikeda ............... G05B 19/41825
700/114

FOREIGN PATENT DOCUMENTS

CN 107891425 A 4/2018
CN 109277869 A 1/2019
(Continued)

OTHER PUBLICATIONS

International Search Report issued in PCT/JP2022/003030; mailed Apr. 19, 2022.

*Primary Examiner* — Ryan A Jarrett
(74) *Attorney, Agent, or Firm* — Studebaker Brackett PLLC

(57) ABSTRACT

A numerical control system 1 comprises a robot control device 6 that controls an action of a robot 30, and a numerical control device 5 that is communicably connected to the robot control device 6, and controls an action of a machine tool 2. The robot control device 6 comprises: a storage unit 61 that stores a plurality of robot programs determined for each operating action with respect to a target of an operation, the target of the operation being the machine tool 2 and the numerical control device 5; a data transmission and reception unit 69 that acquires a state of the target of the operation; a program selection and activation unit 63 that, among the plurality of programs stored in the storage unit 61, selects and activates a program according to an analysis result: and an action control unit 64 that controls the action of the robot 30 on the basis of the activated robot program.

10 Claims, 6 Drawing Sheets

(56)          References Cited

FOREIGN PATENT DOCUMENTS

| | | | |
|---|---|---|---|
| CN | 111360814 | A | 7/2020 |
| CN | 112088070 | A | 12/2020 |
| JP | S62-166952 | A | 7/1987 |
| JP | H05-104391 | A | 4/1993 |
| JP | 2010-052060 | A | 3/2010 |
| JP | 2010-277425 | A | 12/2010 |
| JP | 2015-168038 | A | 9/2015 |
| JP | 2018-124910 | A | 8/2018 |
| JP | 2018-535459 | A | 11/2018 |
| JP | 2018-195055 | A | 12/2018 |
| JP | 2022-015933 | A | 1/2022 |
| WO | 2020/144772 | A1 | 7/2020 |

* cited by examiner

1

ROBOT CONTROL DEVICE AND NUMERICAL CONTROL SYSTEM

TECHNICAL FIELD

The present disclosure relates to a robot control device and a numerical control system.

BACKGROUND ART

In recent years, a numerical control system has been desired which links and controls the operation of a machine tool that machines a workpiece, and a manipulation operation establishing this machine tool as a manipulation target, and is done by a robot on this manipulation target (for example, an attachment/detachment operation of a workpiece to the machine tool, and an open/close operation of a door of the machine tool) (for example, refer to Japanese Unexamined Patent Application, Publication Nos. 2018-195055 and H5-104391).

Generally, the operation of a machine tool is controlled by a numerical control device, and operation of a robot is controlled by a robot control device. For this reason, manipulation of both the numerical control device and the robot control device is necessary to link and control the operation of the machine tool and the operation of the robot. In contrast, with the numerical control system shown in Japanese Unexamined Patent Application, Publication No. 2018-195055, setting by a user is facilitated by enabling selection of an operation program of the robot and setting of an operation program in accordance with a designation by the user from the side of the numerical control device. It should be noted that Japanese Unexamined Patent Application, Publication No. H5-104391 shows technology establishing a machine tool as a manipulation target and opening and closing the door of this manipulation target by way of a robot; however, it is not specifically considered how the robot control device and manipulation target should be configured to collaborate.

Patent Document 1: Japanese Unexamined Patent Application, Publication No. 2018-195055
Patent Document 2: Japanese Unexamined Patent Application, Publication No. H5-104391

DISCLOSURE OF THE INVENTION

Problems to be Solved by the Invention

However, in the case of an existing machine tool being established as the manipulation target and controlling in connection the operation of this manipulation target and a manipulation operation on the manipulation target by way of a robot which was installed later, it is necessary to connect the numerical control device that controls the operation of the manipulation target and the robot control device that controls operation of the robot. In addition, on this occasion, it is necessary to newly add commands such I/O signals and M code to this numerical control device and robot control device, and newly install peripheral equipment such as a PLC (programmable logic controller). Furthermore, on this occasion, since it is necessary for the I/O signal to be sent to the robot control device through a ladder circuit of the numerical control device, it is also necessary to edit an existing ladder circuit. For this reason, there are cases where it is not possible to flexibly apply actual machining sites.

The present disclosure has been made taking account of the above situation, and provides a robot control device and numerical control system which can easily link the operation of a manipulation target and operation of a robot system on the manipulation target.

Means for Solving the Problems

An aspect of the present disclosure provides a robot control device for controlling operation of a robot system including a robot, the robot control device including: a storage unit which stores a plurality of programs prescribed for every operation of the robot system on a manipulation target provided within an operation range of the robot system; a state acquisition unit which acquires a state of the manipulation target; an analysis unit which analyzes the state acquired by the state acquisition unit; a program selection activation unit which selects and activates a program according to an analysis result by the analysis unit from among the plurality of programs stored in the storage unit; and an operation control unit which controls operation of the robot system based on the program activated by the program selection activation unit.

An aspect of the present disclosure provides a numerical control system including: a robot control device which controls operation of a robot system including a robot; and a numerical control device which is communicably connected with the robot control device and controls operation of a machine tool provided within an operation range of the robot system based on a numerical control program, in which the robot control device includes: a storage unit that stores a plurality of programs establishing the machine tool and the numerical control device as a manipulation target and prescribed for every operation of the robot system on the manipulation target, a state acquisition unit that acquires a state of the manipulation target, an analysis unit that analyzes a state acquired by the state acquisition unit, a program selection activation unit that selects and activates a program according to an analysis result by the analysis unit from among a plurality of programs stored in the storage unit, and an operation control unit that controls operation of the robot system based on a program activated by the program selection activation unit.

Effects of the Invention

In the aspect of the present disclosure, the storage unit stores a plurality of programs prescribed for every operation of a robot system on the manipulation target provided within the operation range of the robot system, the state acquisition unit acquires a state of the above-mentioned manipulation target, the analysis unit analyzes the acquired state, the program selection activation unit selects and activates a program according to the analysis result from among the plurality of programs prescribed for every operation on the manipulation target, and the operation control unit controls operation of the robot system based on the activated program. Since the robot control device can thereby cause the robot system perform the appropriate operation according to the state of the manipulation target at this time, it is possible to easy link the operation of the manipulation target and operation of the robot system on the manipulation target.

Figure 1:
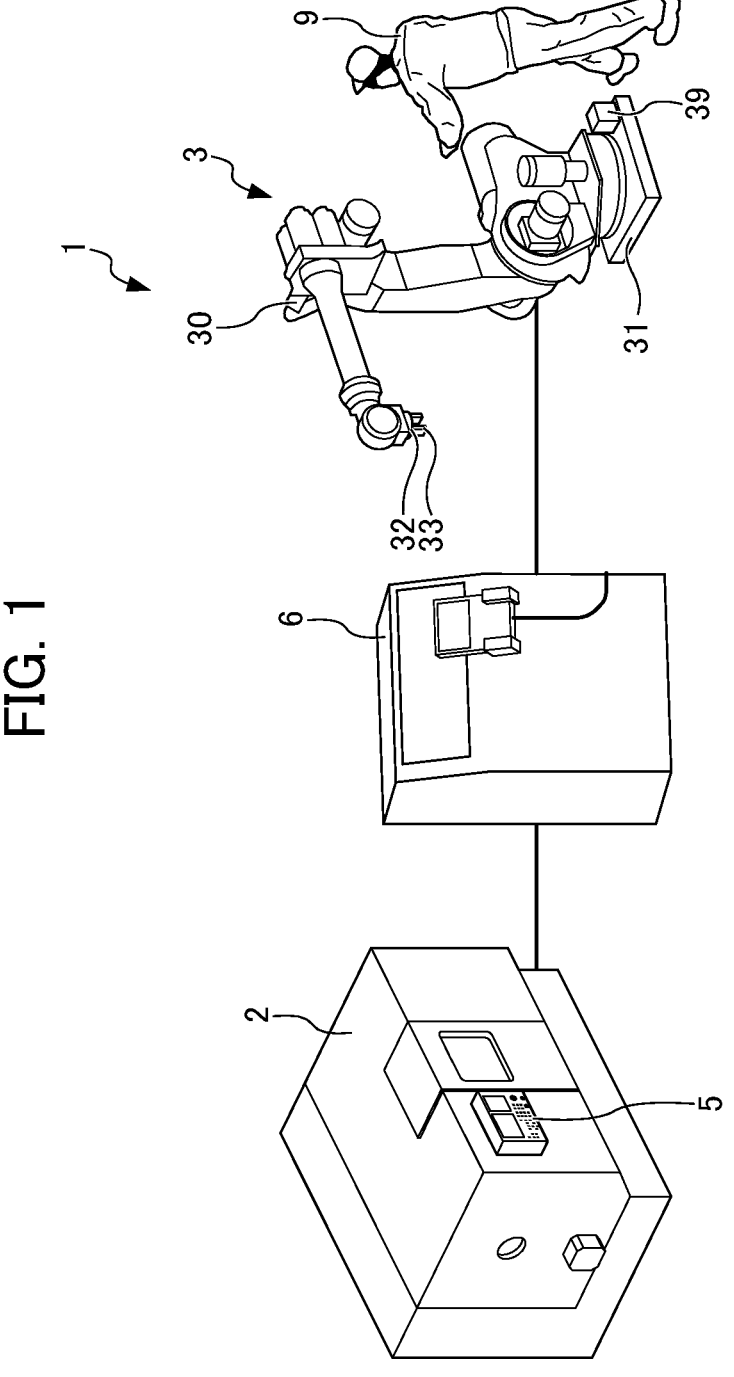
FIG. 1 is a schematic drawing of a robot control device and a numerical control system including this robot control device according to a first embodiment of the present disclosure.

PREFERRED MODE FOR CARRYING OUT
THE INVENTION

First Embodiment

Hereinafter, a numerical control device 6 according to a first embodiment of the present disclosure and a numerical control system 1 including this robot control device 6 will be explained by referencing the drawings.

A numerical control system 1 includes: a machine tool 2 which machines a workpiece (not shown), a numerical control device (CNC) 5 which controls operation of this machine tool 2, a robot system 3 provided in the vicinity of the machine tool 2 and the numerical control device 5, and a robot control device 6 which controls operation of the robot system 3. The numerical control system 1 links and controls the operation of the machine tool 2 and robot system 3, by using the numerical control device 5 and robot control device 6 which are connected to be communicable with each other.

The machine tool 2 is, for example, a lathe, a ball mill, a milling machine, a grinding machine, a laser processing machine, an injection molding machine, or the like; however, it is not limited thereto. The machine tool 2 executes various operations such as a machining operation on the workpiece (not shown), a movement operation of the spindle, table, etc. machining this workpiece, and a door lock operation and lock release operation for protecting the workpiece, in response to various command signals sent from the numerical control device 5 in accordance with the sequence explained later.

The robot system 3 includes a robot 30 which operates under the control by the robot control device 6, a base 31 which supports this robot 30, and a motion sensor 39 provided in the vicinity of the robot 30. The robot 30 manipulates a manipulation target under the control by the robot control device 6, with the machine tool 2 and numerical control device 5 provided within the operation range thereof as the manipulation target. The robot 30, for example, is an articulated robot, and has a tool 33 for gripping the workpiece or door of the machine tool 2, and for conducting a pressing operation on a button or panel provided to the arm tip end 32 thereof. The motion sensor 39 detects the presence of a person within the operation range of the robot 30. A detection signal of the motion sensor 39 is inputted to the robot control device 6. Hereinafter, a case will be explained of the robot 30 being a cooperation-type articulated robot which performs work in cooperation with an operator 9 who is a person; however, it is not limited thereto.

The numerical control apparatus 5 and robot control apparatus 6 are each a computer configured by hardware such as an operation processing means such as a CPU (Central Processing Unit), an auxiliary storage means such as HDD (Hard Disk Drive) or SSD (Solid State Drive) storing various programs, a main storage means such as RAM (Random Access Memory) for storing data temporarily necessitated upon the operation processing means executing programs, an operation means such as a keyboard on which an operator performs various operations, and a display means such as a display that displays various information to the operator. This robot control apparatus 6 and numerical control apparatus 5 are able to transmit various signals with each other by the Ethernet (registered trademark), for example.

Figure 2:
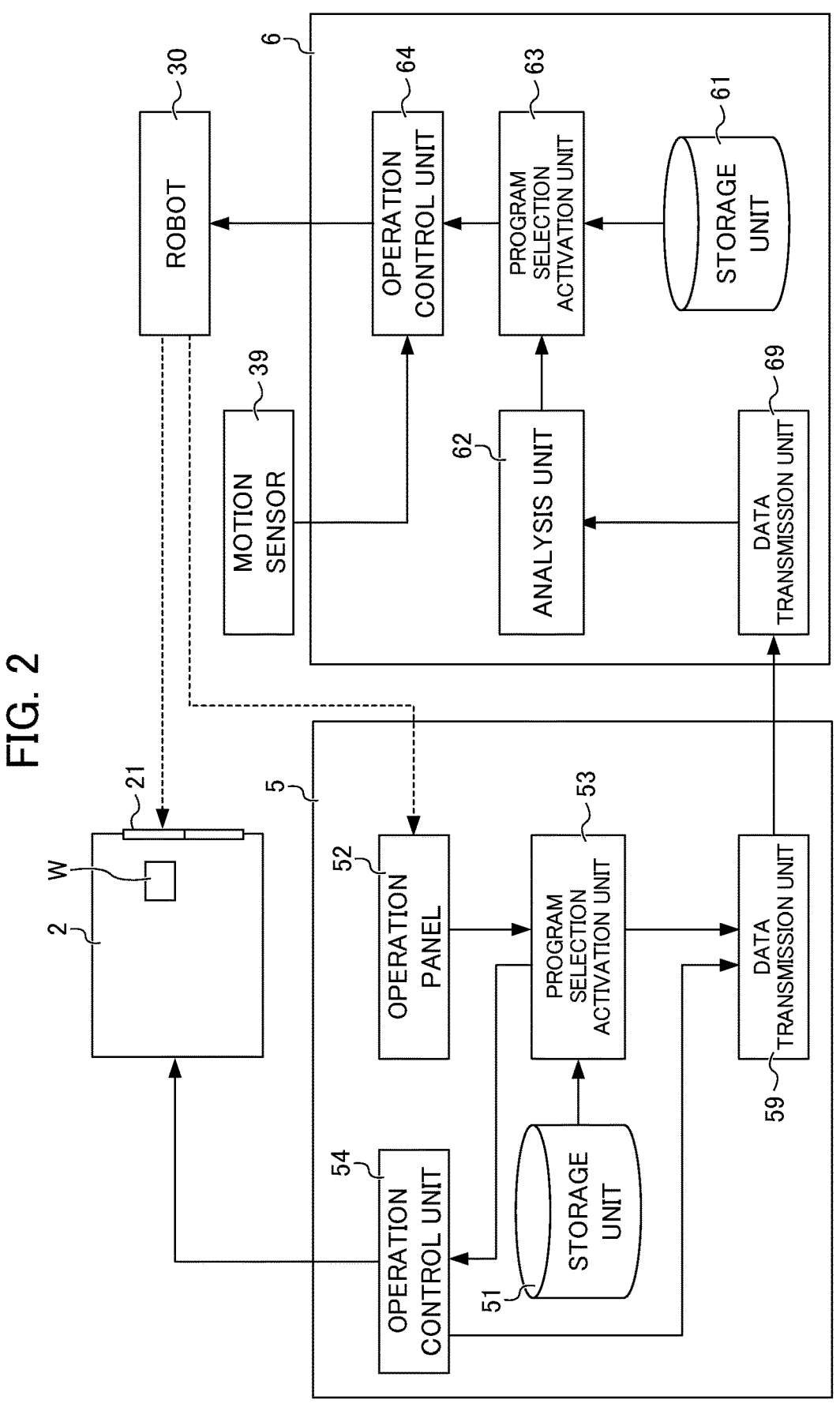
FIG. 2 is a functional block diagram of the numerical control device and the robot control device.

FIG. 2 is a functional block diagram of the numerical control device 5 and robot control device 6.

First, a detailed configuration of the numerical control device 5 will be explained. Various functions such as of a storage unit 51, operation panel 52, program selection activation unit 53, operation control unit 54 and data transmission unit 59 are realized by the above-mentioned hardware configuration in the numerical control device 5, as shown in FIG. 2.

A plurality of numerical control programs for controlling operation of the machine tool 2 are stored in the storage unit 51. The numerical control programs stored in the storage unit 51 are created in advance by an operator in order to control the operation of the machine tool 2 in connection with the operation of the robot 30, which is under the control of the robot control device 6, and are written in a programming language such as G code and M code. The storage unit 51 stores various numerical control programs for controlling operation of the machine tool 2 such as a machining program for machining a workpiece W by moving the control axis and spindle of the machine tool 2, a retracting program which moves the spindle, table, etc. for machining the workpiece W to a retracted position not interfering with the robot 30, and a door lock release program which release a lock of the door 21.

The operation panel 52 includes buttons, a touch panel or the like which can be press operated by the robot 30 or an operator who is a person. The operator and the robot 30 become able to select a numerical control program, activate the selected numerical control program, and stop the numerical control program in execution, by manipulating the operation panel 52. In addition, the operation panel 52 is provided a lock release button which can be press operated by the operator or robot 30 for releasing the lock of the door 21. The operation panel 52 accepts manipulations by the operator or robot 30, and sends a signal according to the accepted operation to the program selection activation unit 53.

The program selection activation unit 53, in the case of accepting a program selection operation by the operation panel 52, selects a numerical control program designated by the program selection operation, from among a plurality of numerical control programs stored in the storage unit 51. The program selection activation unit 53, in the case of accepting a program activation operation according to the operation panel 52, activates a predetermined program or a program selected by the program selection operation accepted previously, among the plurality of numerical control programs stored in the storage unit 51, based on the manipulation accepted by the operation panel 52. The program selection activation unit 53, in the case of accepting a program stop operation by the operation panel 52, stops the numerical control program in execution. In addition, the program selection activation unit 53, in the case of the lock release button of the operation panel 52 being pressed, selects and activates the door lock release program from among the plurality of numerical control programs stored in the storage unit 51.

The operation control unit 54 controls operation of the machine tool 2 based on the numerical control program activated by the program selection activation unit 53.

The data transmission unit 59 sends various notifications including information related to the state of the manipulation target of the robot 30, more specifically, the execution state of the numerical control program in the numerical control device 5, state of the machine tool 2, etc., to the robot control device 6 as appropriate. Herein, the notifications sent from the data transmission unit 59 to the robot control device 6, for example, include a preparation completion notification indicating a state in which preparation for the numerical control device 5 and machine tool 2 to start machining of the workpiece W has completed (i.e. state in which unmachined workpiece W is installed at predetermined position, door 21 is closed, and further locked), a program end notification indicating that execution of the numerical control program has ended appropriately, an abnormality notification indicating that some kind of abnormality occurred in the machine tool 2 during execution of the numerical control program, a door state notification including information related to the open/close state or lock state of the door 21, etc.

Next, the configuration of the robot control device 6 will be explained in detail. Various functions such as of a storage unit 61, analysis unit 62, program selection activation unit 63, operation control unit 64 and data transmission unit 69 are realized by the above-mentioned hardware configuration in the robot control device 6 as shown in FIG. 2.

With the machine tool 2 and numerical control device 5 provided within the operation range of the robot 30 as the manipulation targets, a plurality of robot programs prescribed for every manipulation operation by the robot 30 on this manipulation target are stored in the storage unit 61. The storage unit 61 stores a plurality of robot programs for controlling operation of the robot 30 such as a activation manipulation program prescribing a program activation manipulation operation on the operation panel 52 of the machine tool 2, a stop manipulation program prescribing the program stop manipulation operation on the operation panel 52, a selection manipulation program prescribing the program selection manipulation operation on the operation panel 52, a lock release program prescribing a door lock release operation on the operation panel 52, a door close manipulation program prescribing a door close manipulation operation closing the door 21 of the machine tool 2, a door open manipulation program prescribing a door open manipulation operation opening the door 21, and a workpiece replacement program prescribing a workpiece replacement operation on the workpiece W installed on the machine tool 2.

Herein, program activation manipulation operation refers to making the tool 33 of the robot 30 approach the operation panel 52, and further perform a program activation manipulation on the operation panel 52 by this tool 33. The program stop manipulation operation refers to making the tool 33 of the robot 30 approach the operation panel 52, and further performing a program stop manipulation on the operation panel 52 by this tool 33.

The program selection manipulation operation refers to making the tool 33 of the robot 30 approach the operation panel 52, and further performing a program selection manipulation of selecting a machining program or retracting program on the operation panel 52 by this tool 33. In the aforementioned way, in the numerical control device 5 according to the present embodiment, the operator or robot 30 becomes able to select a machining program or retracting program by manipulating the operation panel 52. Therefore, hereinafter, a selection manipulation program prescribing the program selection operation of selecting a machining program on the operation panel 52 is referred to as a first selection manipulation program, and a selection manipulation program prescribing the program selection operation of selecting a retracting program on the operation panel 52 is referred to as a second selection manipulation program.

Door lock release operation refers to making the tool 33 of the robot 30 approach the operation panel 52, and further pressing the lock release button provided to the operation panel 52 by this tool 33. Door closing manipulation operation refers to making the tool 33 of the robot 30 approach the door 21, grip the door 21 by the tool 33, and sliding this door 21 in the closed direction, thereby opening the door 21. In addition, door opening manipulation operation refers to making the tool 33 of the robot 30 approach the door 21, gripping the door 21 by the tool 33, and sliding this door 21 in the opened direction, thereby closing the door 21. In addition, the workpiece replacement operation refers to making the tool 33 approach within the machine tool 2, gripping the workpiece W installed in the machine tool 2 by the tool 33, moving this workpiece W until a predetermined position outside of the machine tool 2, followed by gripping a new workpiece W, and moving this new workpiece W to a predetermined position in the machine tool 2.

The data transmission unit 69 is communicably connected with the data transmission unit 59 of the numerical control device 5. The data transmission unit 69 acquires notifications related to information of a manipulation target of the robot 30 sent from the data transmission unit 59 via the above-mentioned communication, and sends the acquired notification to the analysis unit 62. In other words, in the present embodiment, the state acquisition unit that acquires the state of a manipulation target of the robot 30 is configured by the data transmission unit 69.

The analysis unit 62 analyzes a notification sent from the data transmission unit 69, and sends the analysis result to the program selection activation unit 63.

The program selection activation unit 63 selects and activates a robot program according to the analysis result by the analysis unit 62 from among the plurality of robot programs stored in the storage unit 61, and notifies instructions written in the activated robot program to the operation control unit 64 successively.

The operation control unit 64 controls operation of the robot 30 and tool 33, based on the detection signal inputted from the motion sensor 39 and the robot program activated by the program selection activation unit 63. More specifically, the operation control unit 64 calculates time series data of a control point of the robot 30 in response to the instructions notified from the program selection activation unit 63, and calculates a target angle of each joint of the robot 30 based on this time series data, then further generates a robot control signal for the robot 30 by feedback controlling each servomotor of the robot 30, and inputs this to the servomotors of the robot 30 so that this target angle is realized. In addition, the operation control unit 64 generates I/O signals for driving the tool 33 of the robot 30 according to the instructions notified from the program selection activation unit 63, and inputs this to the actuator of the tool 33.

In addition, the operation control unit 64 switches the operation mode of the robot 30 between a cooperation mode and high-speed mode, based on the detection signal inputted from the motion sensor 39. More specifically, the operation control unit 64 controls operation of the robot 30 under a cooperation mode in the case of the presence of the operator 9 within the operation range of the robot 30 being detected by the motion sensor 39, and controls operation of the robot 30 under a high-speed mode in the case of the presence of the operator 9 within the operation range of the robot 30 not being detected by the motion sensor 39.

Under the cooperation mode, the operation control unit 64 controls operation of the robot 30 at an operation speed at which operation of the robot 30 is safe for an operator 9 in the surroundings. In addition, under the cooperation mode, the operation control unit 64 stops operation of the robot 30, in the case of detecting an external force on the robot 30 due to contact. In addition, under the high-speed mode, the operation control unit 64 controls operation of the robot 30 at an operation speed faster than the cooperation mode.

Figure 3:
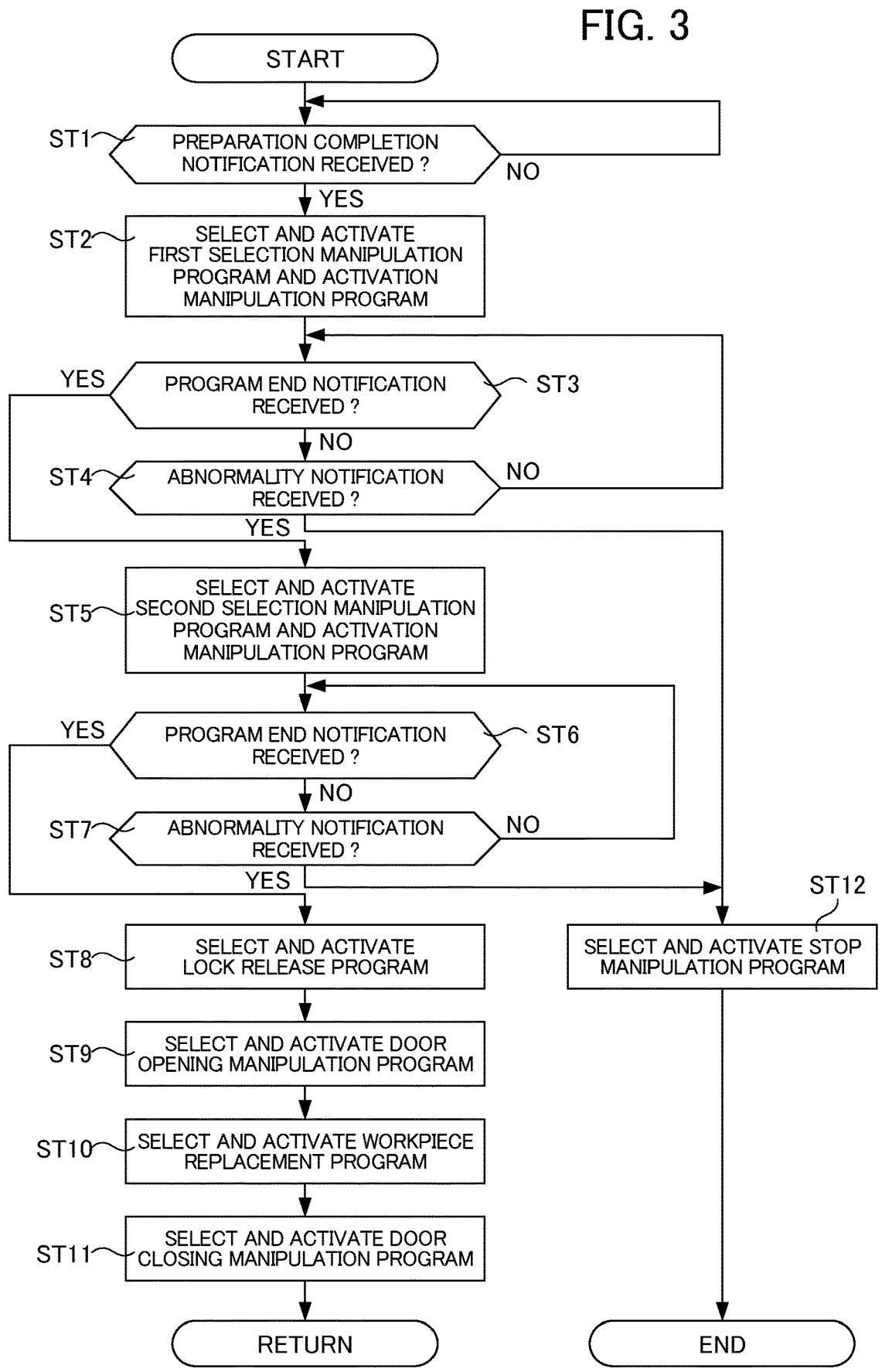
FIG. 3 is a flowchart (1 of 1) showing a sequence of selecting and activating a robot program for controlling operation of a robot in a program selection activation unit of the robot control device.

FIG. 3 is a flowchart showing a sequence of selecting and activating a robot program for controlling operation of the robot 30 in the program selection activation unit 63 of the robot control device 6. The processing shown in FIG. 3 starts in response to the robot control device 6 and numerical control device 5 being activated by the operator, and is repeatedly executed until the robot control device 6 and numerical control device 5 are stopped by the operator.

First, in Step ST1, the program selection activation unit 53 determines whether having received a preparation completion notification from the numerical control device 5. The program selection activation unit 53 stands by until receiving a preparation completion notification from the numerical control device 5, and advances to Step ST2 in response to receiving the preparation completion notification.

Next, in Step ST2, the program selection activation unit 53 selects and activates the first selection manipulation program and activation manipulation program from among the plurality of robot programs stored in the storage unit 61, to start machining of the workpiece W by the machine tool 2, in response to receiving the preparation completion notification from the numerical control device 5, and then advances to Step ST3. The robot 30 thereby performs a program selection manipulation operation of selecting a machining program on the operation panel 52 of the numerical control device 5, under the control of the operation control unit 64, and then performs the program activation manipulation operation of activating the machining program selected on the operation panel 52.

Next, in Step ST3, the program selection activation unit 53 determines whether having received the program end notification from the numerical control device 5. The program selection activation unit 53 advances to Step ST5 in the case of the determination result in Step ST3 being YES, and advances to Step ST4 in the case of the determination result in Step ST3 being NO.

Next, in Step ST4, the program selection activation unit 53 determines whether having receiving an abnormality notification from the numerical control device 5. The program selection activation unit 53 advances to Step ST12 in the case of the determination result in Step ST4 being YES, and returns to Step ST3 in the case of the determination result in Step ST4 being NO. In other words, the program selection activation unit 53 stands by until receiving a program end notification or abnormality notification from the numerical control device 5, then advances to Step ST5 in the case of having received the program end notification, and advances to Step ST12 in the case of having receiving an abnormality notification.

Next, in Step ST5, the program selection activation unit 53 determines that execution of the machining program ended appropriately in the numerical control device 5 in response to having received the program end notification from the numerical control device 5, selects and activates the second selection manipulation program and activation manipulation program from among the plurality of robot programs stored in the storage unit 61 to move the spindle, table or the like for machining the workpiece W in the machine tool 2 to the retracted position, followed by advancing to Step ST6. The robot 30 thereby performs a program selection manipulation operation of selecting a retracting program on the operation panel 52 of the numerical control device 5 under the control of the operation control unit 64, followed by performing the program activation manipulation operation of activating a retracting program selected on the operation panel 52.

Next, in Step ST6, the program selection activation unit 53 determines whether having received the program end notification from the numerical control device 5. The program selection activation unit 53 advances to Step ST8 in the case of the determination result in Step ST6 being YES, and advances to Step ST7 in the case of the determination result in Step ST6 being NO.

Next, in Step ST7, the program selection activation unit 53 determines whether having received an abnormality notification from the numerical control device 5. The program selection activation unit 53 advances to Step ST12 in the case of the determination result in Step ST7 being YES, and returns to Step ST6 in the case of the determination result in Step ST7 being NO. In other words, the program selection activation unit 53 stands by until receiving the program end notification or abnormality notification from the numerical control device 5, and advances to Step ST8 in the case of having received the program end notification, and advances to Step ST12 in the case of having received an abnormality notification.

Next, in Step ST8, the program selection activation unit 53 determines that execution of the retracting program in the numerical control device 5 has appropriately ended in response to receiving the program end notification from the numerical control device 5, and selects and activates the lock release program from among the plurality of robot programs stored in the storage unit 61 to release the lock of the door 21 of the machine tool 2, followed by advancing to Step ST9. The robot 30 thereby performs a door lock release operation of pressing a lock release button provided to the operation panel 52 of the numerical control device 5, under the control of the operation control unit 64.

Next, in Step ST9, the program selection activation unit 53 selects and activates the door opening manipulation program from among the plurality of robot programs stored in the storage unit 61, in order to open the door 21 of the machine tool 2 for which the lock was released, and then advances to Step ST10. The robot 30 thereby performs the door opening manipulation operation of opening the door 21 of the machine tool 2 under the control of the operation control unit 64.

Next, in Step ST10, the program selection activation unit 53 selects and activates a workpiece replacement program from among the plurality of robot programs stored in the storage unit 61 in order to replace the workpiece W subjected to machining by the machine tool 2 with a new workpiece, and then advances to Step ST11. The robot 30 thereby performs a workpiece replacement operation of replacing the workpiece W installed in the machine tool 2 with a new workpiece, under the control of the operation control unit 64.

Next, in Step ST11, the program selection activation unit 53 selects and activates a door closing manipulation program from among the plurality of robot programs stored in the storage unit 61 in order to close the door 21 of the machine tool 2, and then returns to Step ST1. The robot 30 thereby performs a door closing manipulation operation of closing the door 21 of the machine tool 2 under the control of the operation control unit 64.

In addition, in Step ST12, the program selection activation unit 53 determines that some abnormality occurred during execution of the numerical control program in the numerical control device 5, in response to receiving the abnormality notification from the numerical control device 5, and selects and activates the stop manipulation program from among the plurality of robot programs stored in the storage unit 61 to forcibly stop the numerical control program in execution, followed by ending the processing shown in FIG. 3. The robot 30 thereby performs a program stop manipulation operation of stopping the numerical control program in execution on the operation panel 52 of the numerical control device 5, under the control of the operation control unit 64.

Figure 4:
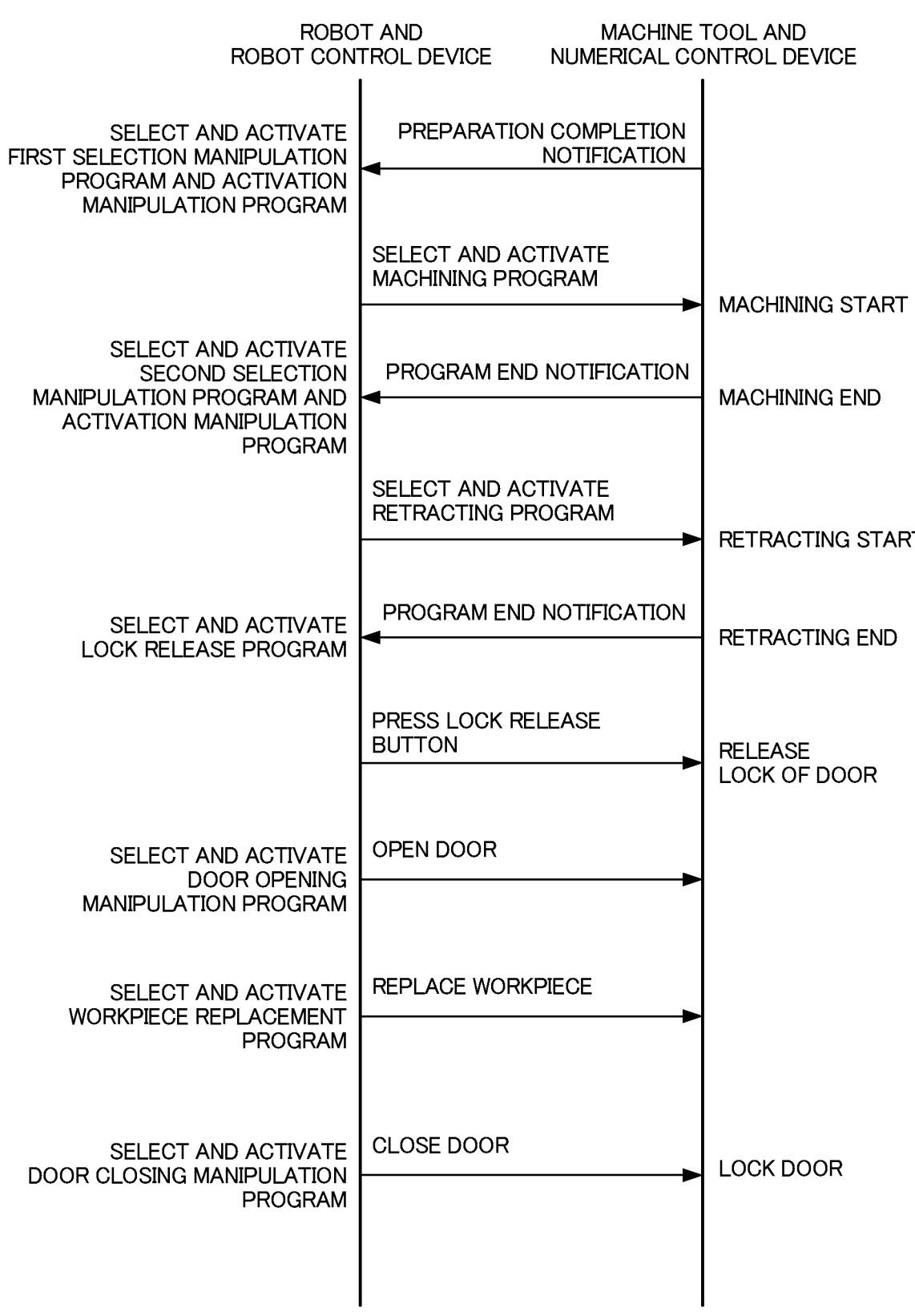
FIG. 4 is a sequence diagram showing the flow of operations performed by a robot on a manipulation target and processing executed in the manipulation target, in a case of operating a robot control device based on the flowchart shown in FIG. 3.

FIG. 4 is a sequence diagram showing the flow of manipulations performed by the robot 30 on the manipulation target (i.e. machine tool 2 and numerical control device 3), and processing executed in the manipulation target, in the case of operating the robot control device 6 based on the flowchart shown in FIG. 3.

First, the numerical control device 5 sends a preparation completion notification to the robot control device 6, in response to preparation for starting machining of the workpiece W in the machine tool 2 completing.

Next, the robot control device 6 selects and activates the first selection manipulation program and activation manipulation program (refer to Step ST2), in response to receiving the preparation completion notification from the numerical control device 5 (refer to Step ST1). In response thereto, the robot 30 performs the program selection manipulation operation of selecting the machining program on the operation panel 52 of the numerical control device 5 and the program activation manipulation operation of activating the selected machining program. The numerical control device 5 activates the machining program in response to accepting the program selection manipulation and program activation manipulation by the robot 30 via the operation panel 52. Machining of the workpiece W thereby starts in the machine tool 2.

Next, the numerical control device 5 sends a program end notification to the robot control device 6, in response to the machining of the workpiece W ending in the machine tool 2. In addition, the robot control device 6 selects and activates the second selection manipulation program and activation manipulation program (refer to Step ST5), in response to receiving the program end notification from the numerical control device 5 (refer to Step ST3). In response thereto, the robot 30 performs a program selection manipulation operation of selecting a retracting program on the operation panel 52 of the numerical control device 5 and program activation manipulation operation of activating the selected retracting program. The numerical control device 5 activates the retracting program, in response to accepting the program selection manipulation and program activation manipulation by the robot 30 via the operation panel 52. In the machine tool 2, movement to the retracted position of the spindle, table, etc. thereby begins.

Next, the numerical control device 5 sends the program end notification to the robot control device 6, in response to movement to the retracted position of the spindle, table, etc. of the machine tool 2 ending. In addition, the robot control device 6 selects and activates the lock release program (refer to Step ST8), in response to receiving the program end notification from the numerical control device 5 (refer to Step ST6). In contrast, the robot 30 presses the lock release button provided to the operation panel 52 of the numerical control device 5. The numerical control device 5 releases the lock of the door 21 of the machine tool 2, in response to the lock release button of the operation panel 52 being pressed.

Next, the robot control device 6 selects and activates the door opening manipulation program (refer to Step ST9). In response thereto, the robot 30 opens the door 21 of the machine tool 2.

Next, the robot control device 6 selects and activates the workpiece replacement program (refer to Step ST10). In response thereof, the robot 30 replaces the workpiece W installed in the machine tool 2.

Next, the robot control device 6 selects and activates the door opening manipulation program (refer to Step ST11). In response thereto, the robot 30 closes the door 21 of the machine tool 2. In addition, the machine tool 2 locks in the state closing the door 21, in response to the door 21 being closed by the robot 30.

According to the present embodiment, the following effects are exerted. In the robot control device 6, the storage unit 61 stores a plurality of robot programs prescribed for every manipulation operation on the manipulation target provided within the operation range of the robot 30, the data transmission unit 69 acquires the state of the above-mentioned manipulation target, the analysis unit 62 analyzes the acquired state, the program selection activation unit 63 selects and activates the robot program according to the analysis result from among the plurality of robot programs prescribed for every manipulation operation on the manipulation target, and the operation control unit 64 controls operation of the robot 30 based on the activated robot program. The robot control device 6 can thereby cause the robot 30 to perform the appropriate manipulation operation according to the state of the manipulation target at this time; therefore, it is possible to easily link the operation of the manipulation target and the manipulation operation on the manipulation target by the robot 30.

In the present embodiment, the numerical control device 5 controlling operation of the machine tool 2, based on the manipulation accepted by the machine tool 2 machining the workpiece W and the control panel 52 and the numerical control program, is established as the manipulation target of the robot 30, and the data transmission unit 69 of the robot control device 6 acquires the execution state of the numerical control program of the numerical control device 5 via communication. The program selection activation unit 63 of the robot control device 6 can thereby perform the appropriate manipulation according to the execution state of the numerical control program in the numerical control device 5, on the machine tool 2 and the numerical control device 5.

In the present embodiment, the storage unit 61 of the robot control device 6 stores a plurality of robot programs prescribed for every manipulation operation on the operation panel 52 of the numerical control device 5. The robot control device 6 can thereby perform various manipulations on the operation panel 52 by the robot 30.

In the present embodiment, the storage unit 61 of the robot control device 6 stores the activation manipulation program prescribing the program activation manipulation operation on the operation panel 52 of the numerical control device 5, and the numerical control device 5 activates a predetermined numerical control program in response to accepting a program activation manipulation by the operation panel 52. The robot control device 6 can thereby activate a predetermined numerical control program in the numerical control device 5, by performing a program activation manipulation on the operation panel 52 by the robot 30.

In the present embodiment, the storage unit 61 of the robot control device 6 stores a stop manipulation program prescribing a program stop manipulation operation on the operation panel 52 of the numerical control device 5, and the numerical control device 5 stops the numerical control program in execution in response to accepting a program stop manipulation by the operation panel 52. The robot control device 6 can thereby stop the numerical control program in execution in the numerical control device 5, by performing the robot stop manipulation on the operation panel 52 by the robot 30.

In the present embodiment, the storage unit 61 of the robot control device 6 stores the selection manipulation program prescribing the program selection manipulation operation on the operation panel 52 of the numerical control device 5, and the numerical control device 5 selects the numerical control program designated by the program selection manipulation from among the plurality of numerical control programs in response to accepting a program selection manipulation by the operation panel 52. The robot control device 6 can thereby select a predetermined numerical control program in the numerical control device 5, by performing a program selection manipulation on the operation panel 52 by the robot 30.

In the present embodiment, the data transmission unit 69 of the robot control device 6 acquires a notifications including the open/close state of the door 21 of the machine tool 2. The robot control device 6 can thereby perform the appropriate manipulation according to the open/close state of the door 21 of the machine tool 2, by way of the robot 30 on the numerical control device 5 and/or machine tool 2.

In the present embodiment, the storage unit 61 of the robot control device 6 stores at least any of a door close manipulation program prescribing a door closing manipulation operation of closing the door 21 by the robot 30 and a door open manipulation program prescribing a door opening manipulation operation of opening the door 21 by the robot 30. The robot control device 6 can thereby open or close the door 21 of the machine tool 2 by the robot 30.

In the present embodiment, the operation control unit 64 of the robot control device 6 switches the operation modes of the robot 30 between a case of the presence of an operator 9 within the operation range of the robot 30 being detected by the motion sensor 39, and a case of the presence of an operator 9 within the operation range of the robot 30 not being detected by the motion sensor 39. More specifically, the operation control unit 64 controls operation of the robot 30 under a cooperation mode in which the operation speed is slow in the case of the presence of the operator 9 within the operation range of the robot 30 being detected by the motion sensor 39, and controls operation of the robot 30 under a high-speed mode in which the operation speed is faster than the cooperation mode, in the case of the presence of the operator 9 within the operation range of the robot 30 not being detected by the motion sensor 39. The robot control device 6 can thereby perform the appropriate manipulation operation according to the state of the manipulation target at this time and the presence/absence of the operator 9 in the surroundings, with the robot 30.

Second Embodiment

Next, a numerical control system according to a second embodiment of the present disclosure will be explained while referencing the drawings. It should be noted that, in the following explanation, the same reference symbols are attached to configurations which are the same as the numerical control system 1 according to the first embodiment, and detailed explanations thereof will be omitted.

Figure 5:
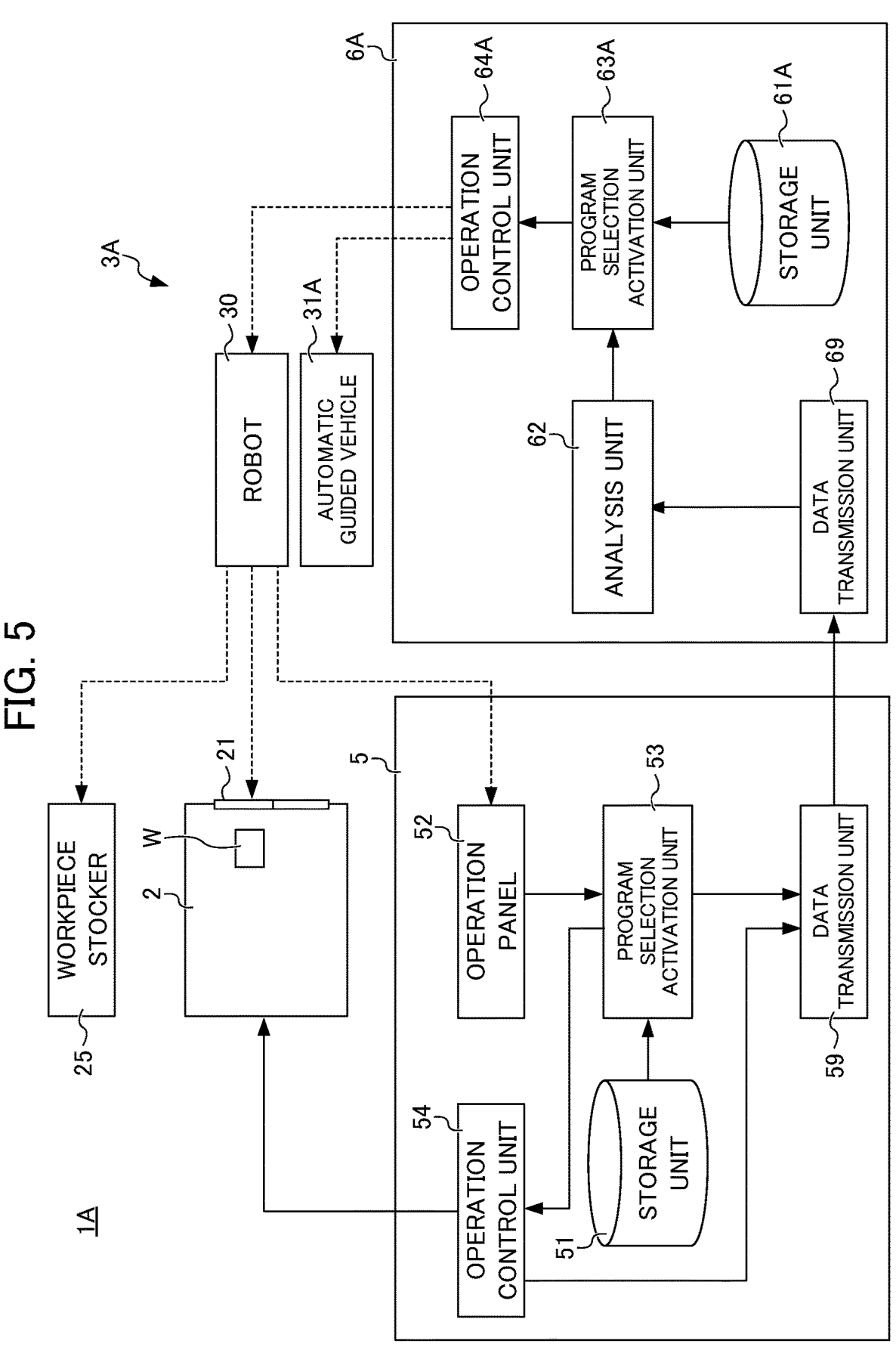
FIG. 5 is a functional block diagram of a numerical control system according to a second embodiment of the present disclosure.
Figure 6:
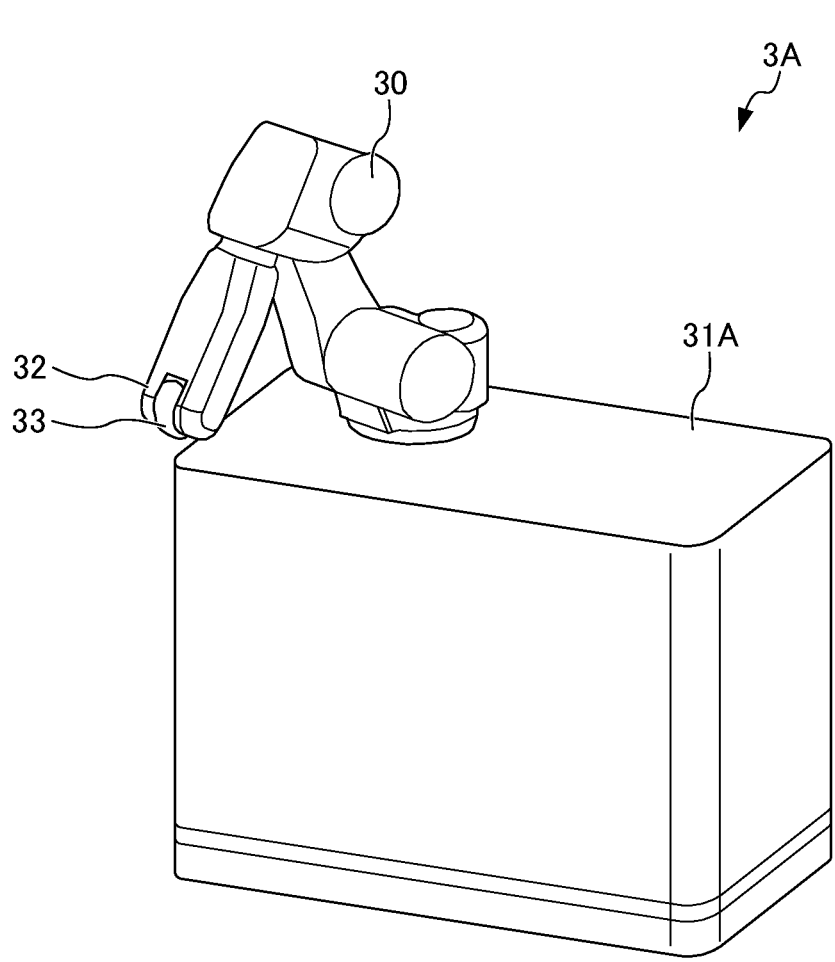
FIG. 6 is a view showing the configuration of a robot system.

FIG. 5 is a functional block diagram of a numerical control system 1A including the numerical control device 5 and a robot control device 6A according to the present embodiment. FIG. 6 is a view showing the configuration of a robot system 3A, which is a control target of the robot control device 6A according to the present embodiment.

As shown in FIG. 6, the robot system 3A according to the present embodiment includes a robot 30 which operates under the control by the robot control device 6A, and an automatic guided vehicle 31A which supports this robot 30 and operates under the control by the robot control device 6A. The robot system 3A according to the present embodiment differs from the robot system 3 according to the first embodiment in the point of equipping the robot 30 to the automatic guided vehicle 31A, which is a mobile body.

The automatic guided vehicle 31A moves on the floor surface according to a control signal sent from the robot control device 6A. By moving the robot 30 by such an automatic guided vehicle 31A, it is possible to move the operation range of the robot 30. In other words, with the robot system 3 according to the first embodiment, since the position of the robot 30 is fixed, the operation range of the robot 30 is also fixed. In contrast, since the robot system 3A according to the preset embodiment can move the robot 30 by the automatic guided vehicle 31A, the operation range of the robot system 3A overall combining the robot 30 and automatic guided vehicle 31A is broader than the robot system 3 according to the first embodiment.

Next, the configuration of the robot control device 6A will be explained in detail while referencing FIG. 5. Various functions such as of a storage unit 61A, analysis unit 62, program selection activation unit 63A, operation control unit 64A and data transmission unit 69 are realized in the robot control device 6A as shown in FIG. 5.

The storage unit 61A stores a plurality of robot programs, which establish the machine tool 2 provided within the operation range of the robot system 3A, the numerical control device 5 and a workpiece stocker 25 holding a plurality of the workpieces as the manipulation target, and are prescribed for every manipulation operation by the robot 30 for these manipulation targets; and a plurality of movement programs prescribed for every movement operation of the automatic guided vehicle 31A for these manipulation targets. The storage unit 61A stores, in addition to the plurality of robot programs explained in the first embodiment (activation manipulation program, stop manipulation program, selection manipulation program, lock release program, door close manipulation program, door open manipulation program, workpiece replacement program, etc.), a plurality of robot programs for controlling operation of the robot 30, such as a workpiece retrieving operation program prescribing a workpiece retrieving operation of retrieving the workpiece W held in the workpiece stocker 25. In addition, the storage unit 61A stores, in addition to the above such robot programs, a plurality of movement programs for controlling operation of the automatic guided vehicle 31A, such as a machine tool approach program prescribing a machine tool approach operation of moving the automatic guided vehicle 31A to the machine tool 2; a numerical control device approach program prescribing a numerical control device approach operation moving the automatic guided vehicle 31A to the numerical control device 5; and a workpiece stocker approach program prescribing a workpiece stocker approach operation of moving the automatic guided vehicle 31A to the workpiece stocker 25.

Herein, workpiece retrieving operation refers to making the tool 33 of the robot 30 approach the workpiece stocker 25, and gripping one among a plurality of workpieces W held in the workpiece stocker 25 by the tool 33.

Herein, machine tool approach operation refers to moving the automatic guided vehicle 31A towards the machine tool manipulation position prescribed in the vicinity of the machine tool 2. In addition, machine tool manipulation position refers to a position including the machine tool 2 within the operation range of the robot 30 equipped to the automatic guided vehicle 31A, and a position at which the robot 30 can the perform door closing manipulation operation, door opening manipulation operation and workpiece replacement operation on the machine tool 2.

Numerical control device approach operation refers to moving the automatic guided vehicle 31A towards the numerical control device manipulation position prescribed in the vicinity of the numerical control device 5. In addition, numerical control manipulation position is a position including the operation panel 52 of the numerical control device 5 within the operation range of the robot 30 equipped to the automatic guided vehicle 31A, and a position at which the robot 30 can perform a program activation manipulation operation, program stop manipulation operation, program selection manipulation operation and door lock release operation on the operation panel 52.

Workpiece stocker approach operation refers to moving the automatic guided vehicle 31A toward the workpiece stocker manipulation position prescribed in the vicinity of the workpiece stocker 25. In addition, the workpiece stocker manipulation position refers to a position including the workpiece stocker 25 within the operation range of the robot 30 equipped to the automatic guided vehicle 31A, and a position at which the robot 30 can perform a workpiece retrieving operation on the workpiece stocker.

The program selection activation unit 63A selects and activates a program according to the analysis result by the analysis unit 62 from among the plurality of programs stored in the storage unit 61A, and notifies instructions written in the activated program to the operation control unit 64A successively.

The operation control unit 64A controls operation of the robot 30, tool 33 and automatic guided vehicle 31A, based on the program activated by the program selection activation unit 63A. More specifically, the operation control unit 64A, in the case of the robot program being activated by the program selection activation unit 63A, controls operations of the robot 30 and tool 33 in accordance with the same sequence as the operation control unit 64 according to the first embodiment. In addition, the operation control unit 64A, in the case of the movement program being activated by the program selection activation unit 63A, calculates a target movement path of the automatic guided vehicle 31A in response to an instruction notified from the program selection activation unit 63A, and generates a control signal for the automatic guided vehicle 31A so that the automatic guided vehicle 31A moves along this target movement path, and inputs this to the automatic guided vehicle 31A.

According to the present embodiment, the following effects are exerted. In the present embodiment, the robot system 3A which is the control target of the robot control device 6A includes the robot 30, and the automatic guided vehicle 31A to which this robot 30 is equipped. In addition, the storage unit 61A of the robot control device 6A stores a plurality of movement programs prescribed for every movement operation of moving the automatic guided vehicle 31A towards a manipulation target such as the machine tool 2, numerical control device 5 and workpiece stocker 25. The robot control device 6A can thereby move the automatic guided vehicle 31A to the appropriate position according to the state of the manipulation target, and manipulate the manipulation target by the robot 30 equipped to this automatic guided vehicle 31A.

The present disclosure is not limited to the above-mentioned embodiment, and various changes and modifications thereto are possible.

EXPLANATION OF REFERENCE NUMERALS

1, 1A numerical control system
2 machine tool (manipulation target)
W workpiece
21 door
25 workpiece stocker (manipulation target)
3, 3A robot system
30 robot
31A automatic guided vehicle (mobile body)
33 tool
5 numerical control device
51 storage unit
52 operation panel (manipulation accepting unit)
53 program selection activation unit
54 operation control unit
59 data transmission unit
6, 6A robot control device
61, 61A storage unit
62 analysis unit
63, 63A program selection activation unit
64, 64A operation control unit
69 data transmission unit (state acquisition unit)

The invention claimed is:

1. A robot control device for controlling operation of a robot system that includes a robot and a mobile body to which the robot is equipped, the robot control device comprising:

a processor configured to execute instructions to implement:

a storage unit which stores a plurality of programs prescribed for every operation of the robot system on a manipulation target provided within an operation range of the robot system;

a state acquisition unit which acquires a state of the manipulation target;

an analysis unit which analyzes the state acquired by the state acquisition unit;

a program selection activation unit which selects and activates a program according to an analysis result by the analysis unit from among the plurality of programs stored in the storage unit; and an operation control unit which controls operation of the robot system based on the program activated by the program selection activation unit, and wherein the robot system includes a motion sensor that detects presence of a person within the operation range, and the operation control unit controls operation of the robot under a cooperation mode in a case where the presence of a person is detected within the operation range by the motion sensor, and controls operation of the robot under a high-speed mode with a faster operation speed than the cooperation mode in a case where the presence of a person is not detected within the operation range by the motion sensor.

2. The robot control device according to claim 1, wherein the manipulation target includes a machine tool that machines a workpiece, and a numerical control device that controls operation of the machine tool based on a manipulation accepted by a manipulation accepting unit and a numerical control program, and wherein the state acquisition unit acquires an execution state of the numerical control program in the numerical control device via communication.

3. The robot control device according to claim 2, wherein the storage unit stores a plurality of programs prescribed for every manipulation operation by the robot on the manipulation accepting unit.

4. The robot control device according to claim 3, wherein the storage unit stores a program prescribing a activation manipulation operation by the robot on the manipulation accepting unit, and wherein the numerical control device activates a predetermined numerical control program in response to accepting the activation manipulation by the manipulation accepting unit.

5. The robot control device according to claim 3, wherein the storage unit stores a program prescribing a stop manipulation operation by the robot on the manipulation accepting unit, and wherein the numerical control device stops a numerical control program in execution in response to accepting the stop manipulation by the manipulation accepting unit.

6. The robot control device according to claim 3, wherein the storage unit stores a program prescribing a selection manipulation operation by the robot on the manipulation accepting unit, and wherein the numerical control device selects a numerical control program in response to accepting the selection manipulation operation by the manipulation accepting unit.

7. The robot control device according to claim 2, wherein the state acquisition unit acquires an open/close state of a door of the machine tool.

8. The robot control device according to claim 7, wherein the storage unit stores at least either of a program prescribing a door closing manipulation operation for closing the door by the robot, and a program prescribing a door opening manipulation operation for opening the door by the robot.

9. The robot control device according to claim 2, wherein the robot system includes the robot and the mobile body, and wherein the storage unit stores a plurality of programs prescribed for every movement operation for moving the mobile body towards the manipulation target.

10. A numerical control system comprising:

a robot control device which controls operation of a robot system including a robot and a mobile body to which the robot is equipped; and a numerical control device including a first processor which is communicably connected with the robot control device and controls operation of a machine tool provided within an operation range of the robot system based on a numerical control program, wherein the robot control device includes a second processor configured to execute instructions to implement:

a storage unit that stores a plurality of programs establishing the machine tool and the numerical control device as a manipulation target and prescribed for every operation of the robot system on the manipulation target, a state acquisition unit that acquires a state of the manipulation target, an analysis unit that analyzes a state acquired by the state acquisition unit, a program selection activation unit that selects and activates a program according to an analysis result by the analysis unit from among a plurality of programs stored in the storage unit, and an operation control unit that controls operation of the robot system based on a program activated by the program selection activation unit, and wherein the robot system includes a motion sensor that detects presence of a person within the operation range, and the operation control unit controls operation of the robot under a cooperation mode in a case where the presence of a person is detected within the operation range by the motion sensor, and controls operation of the robot under a high-speed mode with a faster operation speed than the cooperation mode in a case where the presence of a person is not detected within the operation range by the motion sensor.

* * * * *